Patented Dec. 2, 1947

2,432,062

UNITED STATES PATENT OFFICE 2,432,062

SEPARATION OF METACRESOL FROM PARACRESOL

Francis E. Cislak and Merritt M. Otto, Indianapolis, Ind., assignors to Reilly Tar & Chemical Corporation, Indianapolis, Ind., a corporation of Indiana No Drawing. Application July 5, 1943, Serial No. 493,596

7 Claims. (Cl. 260—290)

Our invention relates to the separation of metacresol from mixtures containing metacresol and paracresol with the metacresol predominating.

It is the object of our present invention to obtain the individual metacresol; and to obtain the new compound metacresol-2,6-lutidine.

A mixture of metacresol and paracresol, associated with various other phenolic bodies, is obtained in the processing of coal tar. As so obtained, the metacresol frequently predominates in amount over the paracresol; or by various procedures, such for instance as that shown in our copending application Serial No. 507,017, filed October 20, 1943, can be made to predominate in amount over the paracresol. The other phenolic bodies commonly present, including orthocresol, can be separated quite readily and fairly completely from the mixture of metacresol and paracresol by fractional distillation. But the boiling points of the metacresol and the paracresol are so close together that it is not commercially practical to separate them by fractional distillation.

We have found that by treating with 2,6-lutidine a mixture of metacresol and paracresol containing more metacresol than paracresol, whether or not the mixture also contains small amounts of higher and/or lower related phenolic bodies (such as orthocresol and the xylenols), and cooling, either before and/or after and/or during the mixing, we get a formation of crystals of metacresol-2,6-lutidine, an addition product of some character composed of one molecule of metacresol and one molecule of 2,6-lutidine. The cooling is desirably to a temperature at least as low as —5° C., but rarely needs to be below —15° C. These crystals can readily be recovered, as by decanting or filtering; and can readily be reconverted into substantially pure metacresol and substantially pure 2,6-lutidine, as by distillation.

Upon the recovery of the crystals of metacresol-2,6-lutidine, by the decanting or filtering above referred to, the mother liquor remaining is much enriched in paracresol, in comparison with the original metacresol-paracresol mixture; and also contains considerable 2,6-lutidine, and some metacresol. This mother liquor may be used as a source of paracresol, as by the procedure set forth in our aforesaid co-pending application Serial No. 507,017.

The metacresol-2,6-lutidine recovered as aforesaid is a new compound. It has a melting point of about 11° C. It is of interest in the preparation of disinfectants and insecticides, as well as in the present process of separating metacresol from paracresol.

The following example illustrates our invention:

Example.—One hundred pounds of a commercial mixture of metacresol and paracresol, containing about 55–60% metacresol, is thoroughly mixed with 110–125 pounds of 2,6-lutidine. With these proportions there is a molecular excess of 2,6-lutidine; which we deem desirable, although it is not essential. The mixing can be done with the ingredients cold, or the mixture may be cooled after the mixing, in either case to obtain a temperature of about —5° C. to —15° C. By such cooling the addition product, metacresol-2,6-lutidine, crystallizes spontaneously from the mixture; although sometimes it is necessary to start crystallization by seeding with crystals of metacresol-2,6-lutidine. The crystals of metacresol-2,6 lutidine produced by the cooling are suitably separated, most conveniently by filtration. These crystals are subjected to fractional distillation, which decompose them into metacresol and 2,6-lutidine, whereupon the 2,6-lutidine distills over first, and then at a much higher temperature the metacresol distills over. As so recovered, the metacresol is usually of about 80% to 90% purity. The metacresol thus obtained is sufficiently pure for many uses. If greater purity of the metacresol is desired, however, it is readily obtained by purification of the metacresol-2,6-lutidine from which it was obtained. Conveniently such purification consists in warming the metacresol-2,6-lutidine until it becomes liquid, at about 8 to 12° C.; after which the liquid is cooled to about 0° to 5° C., whereupon crystals of purified metacresol-2,6-lutidine separate out of the liquid. These purified crystals are separated from the liquid, conveniently by filtration. Upon subjecting these crystals to fractional distillation, in the same manner as before, a metacresol of 90–98% purity is obtained.

The obtaining of the metacresol by distillation from the metacresol-2,6-lutidine, as above described, is our preferred way of obtaining it; but we can obtain it from the metacresol-2,6-lutidine in other ways. For example, we can treat metacresol-2,6-lutidine with an aqueous caustic soda solution, of between 10 and 50% concentration. This decomposes the metacresol-2,6-lutidine, to yield an upper layer of 2,6-lutidine, and a lower layer of metacresol dissolved in aqueous caustic soda. The aqueous caustic soda solution of metacresol is suitably separated from the supernatant 2,6-lutidine, as by decantation. The metacresol is then liberated from the co-present caustic soda in any convenient manner, as by neutralization of the caustic soda with an acid, conveniently sulfuric acid.

We claim as our invention:

1. The process of separating metacresol from a mixture consisting mainly of metacresol and paracresol with the metacresol predominating, which consists in mixing such mixture with 2,6-lutidine and producing in the resulting mixture a sufficiently low temperature to form crystals of metacresol-2.6-lutidine, separating such crystals, and chemically decomposing said crystals to liberate metacresol in purified form.

2. The process of obtaining metacresol-2,6-lutidine, which consists in mixing 2,6-lutidine and a mixture consisting mainly of metacresol and paracresol with the metacresol predominating, producing in the resulting mixture a sufficiently low temperature to form crystals of metacresol-2,6-lutidine, and separating said crystals from the mixture.

3. The process of obtaining metacresol-2,6-lutidine, which consists in bringing metacresol and 2,6-lutidine together at a temperature sufficiently low to produce crystals of metacresol-2,6-lutidine, and recovering said crystals from the mixture.

4. The process of producing metacresol as set forth in claim 1, in which the temperature used to produce crystallization is at least as low as —5° C.

5. The process of obtaining metacresol-2,6-lutidine as set forth in claim 2, in which the temperature used to produce crystallization is at least as low as —5° C.

6. The process of producing metacresol as set forth in claim 1 in which the 2,6-lutidine is added in molecular excess.

7. The process of obtaining metacresol 2,6-lutidine as set forth in claim 2 in which the 2,6-lutidine is added in molecular excess.

FRANCIS E. CISLAK.
MERRITT M. OTTO.

REFERENCES CITED

The following references are of record in the file of this patent:

UNITED STATES PATENTS

| Number | Name | Date |
| --- | --- | --- |
| 1,795,382 | Ulrich | Mar. 10, 1931 |
| 1,980,901 | Bentley et al. | Nov. 13, 1934 |
| 2,113,951 | Shuman | Apr. 12, 1938 |
| 2,193,336 | Lecher et al. | Mar. 12, 1940 |
| 2,310,616 | Cislak et al. | Feb. 9, 1943 |

OTHER REFERENCES

Chemical Abstracts, 1916, page 1955; ibid., 1938, pages 1165–1166; ibid., 1943, page 3757.

Archiv für exper. Path. und Pharmakologie, vol. 191, pages 55–75 (1939).